March 12, 1929.  G. M. SACERDOTE  1,704,841
LOADING ATTACHMENT FOR TRUCKS
Original Filed July 7, 1923
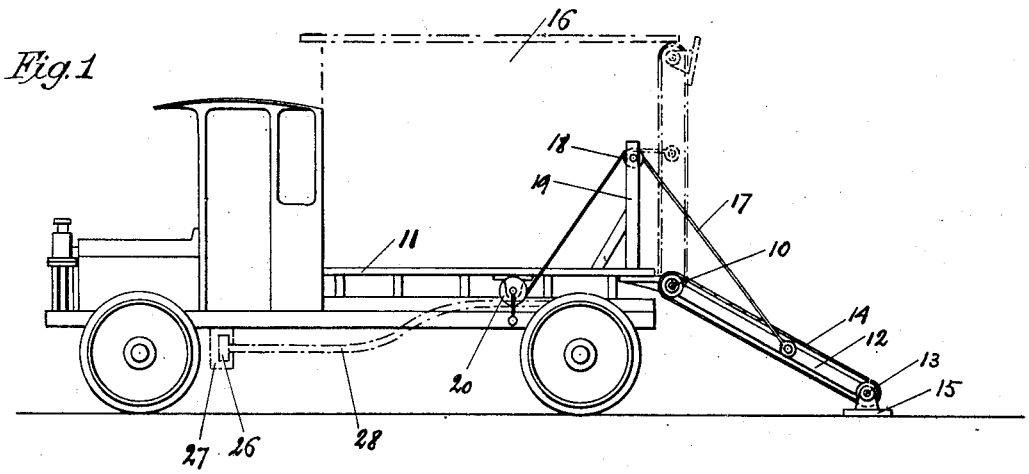
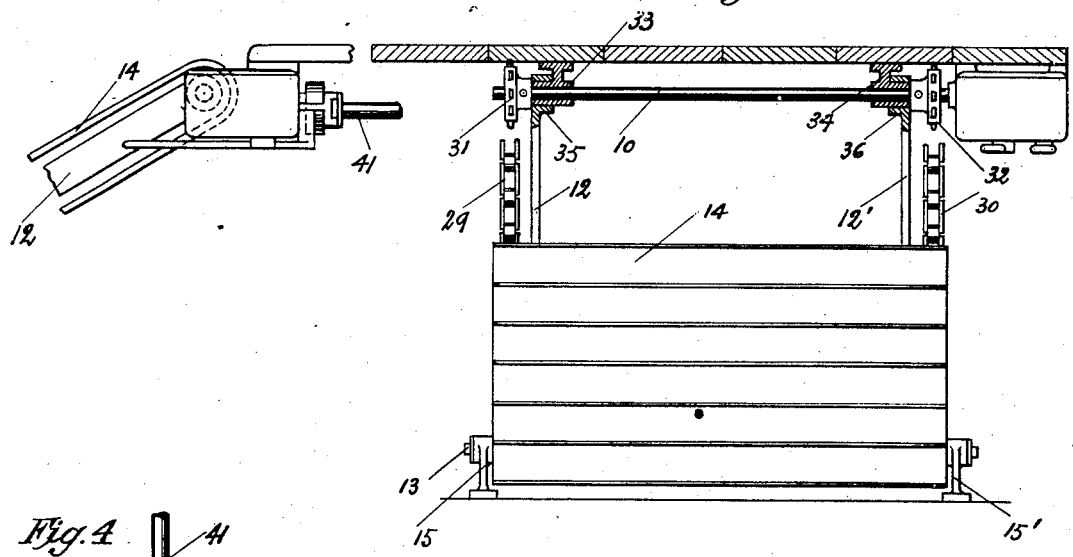
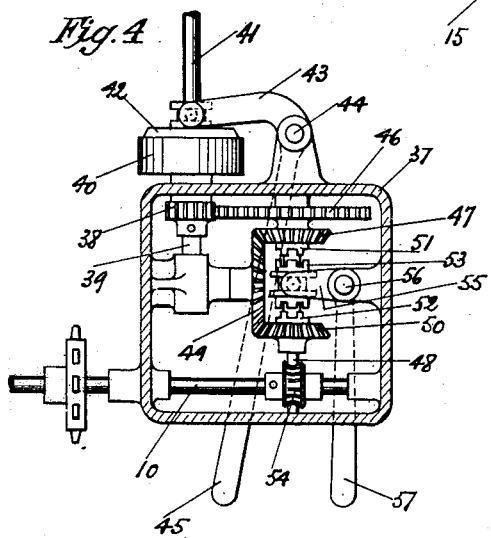
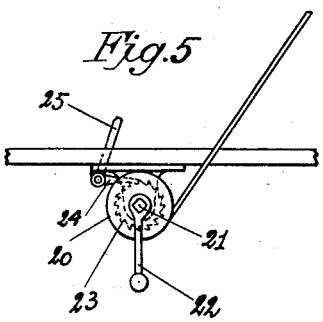
INVENTOR:

Patented Mar. 12, 1929.

1,704,841

UNITED STATES PATENT OFFICE.

GUIDO M. SACERDOTE, OF BAYSIDE, LONG ISLAND, NEW YORK.

LOADING ATTACHMENT FOR TRUCKS.

Original application filed July 7, 1923, Serial No. 650,104. Divided and this application filed March 3, 1926. Serial No. 91,949.

This invention relates to loading and unloading attachments for motor trucks, and more particularly refers to a novel and improved arrangement of conveyor which may be operated, if desired, by the power plant of the truck to which the device is applied.

The primary object of this invention is to provide a simple and convenient arrangement of conveyor, adapted to be mounted at the rear of a truck, to be used for the speedy loading and unloading of the truck itself.

Another object of this invention is to provide a conveyor attachment for motor trucks, of a novel and improved design, which may be most conveniently mounted at the rear of a truck, and which may be quickly lowered to its operative position, or raised to an upright inoperative position above the truck's platform.

Additional objects and advantages of the present invention will more fully appear as the description proceeds, and will be pointed out and claimed in the appended claims.

This is a divisional application of another application for patent on "truck loading and unloading devices", filed by me July 7, 1923, Serial No. 650,104, the subject matter and title of which have been subsequently restricted to "power attachments for motor trucks."

My invention is illustrated in a general way in the annexed drawings, in which:

Fig. 1 is a side view in elevation of a motor truck provided with a conveyor for the loading and unloading of the truck;

Fig. 2 is a fragmentary rear view in elevation, partly sectioned, and in an enlarged scale, of the conveyor attachment;

Fig. 3 is a fragmentary side view in elevation of the same;

Fig. 4 is a detail plan sectional view of a suitable type of operating mechanism which can be employed in connection with the conveyor attachment; and, Fig. 5 is a detail side view in elevation of a hand operated mechanism for raising and lowering the conveyor.

My invention consists, essentially, in a conveyor which may be attached at the rear of a truck's platform, forming substantially an extension of the said platform, and which may be tilted to a downwardly inclined position for loading or unloading the truck, or to an upright or upwardly inclined position when not in operation; said conveyor being preferably operated by the power plant of the truck itself.

The use of conveyors for the loading of trucks is, broadly speaking, not new. Their applications, however, have generally been limited to the loading of materials in bulk, such as sand, or dirt, or snow, and the conveyors used are generally appliances which are separate and independent of the truck itself. In some types of trucks used for the removal of snow, conveyors are mounted directly upon the truck, and carry the snow to devices for melting the snow or for distributing it on the pavement at the side of the truck's path; and strictly speaking, these conveyors cannot be held to be used for the loading and unloading of the truck.

In other cases, conveyors have been mounted upon a truck, for discharging trunks and other parcels from one point to another, as a sort of movable platform; in no case which has come to my notice, has a conveyor for the handling of packages, cases, and ordinary merchandise, been provided on a truck for the rapid handling of its load one way or the other.

According to my invention, a conveyor may be mounted at any convenient point close to the truck's platform; but as a general rule, I prefer to mount the conveyor directly at the rear of the platform, so as to be tiltable about a transversal shaft.

In Fig. 1, 10 designates a shaft which is transversely mounted at the rear of a truck 11, 12 is a conveyor frame which is pivotally mounted on said shaft, 13 is a shaft mounted at the end of the conveyor frame, and 14 is a conveyor of any suitable type mounted on shafts, 10, 13, and operated by shaft 10. Shaft 13 is provided with shoes or blocks 15, acting as outer supports for the conveyor when lowered to the ground or to a loading platform.

When in use, the conveyor is lowered about shaft 10, to the downwardly inclined position shown in full lines in Fig. 1; by causing rotation of shaft 10 (or 13) in one or the other direction, the conveyor will move towards or away from the truck's platform, according to whether the truck has to be loaded or unloaded.

When not in use, the conveyor is preferably raised to an inoperative position, by tilting it upwardly about shaft 10, until it reaches the vertical position shown in dotted lines in said Fig. 1. In this position the conveyor fulfills the function of a rear member of the truck's body, preventing the load from falling out; and if the truck is provided with a closed body, the conveyor will lend itself very nicely for closing the rear part of the body 16, shown in dotted lines.

The conveyor may be raised or lowered in any suitable manner, for instance by means of side cables or chains 17, which pass over pulleys 18, mounted on uprights 19 at the rear of the platform, and which may be wound upon drums 20, mounted on shaft 21, by means of a crank lever 22.

Shaft 21 may be transversely mounted under the truck's platform, as shown in Figs. 1 and 5, and is preferably provided with a ratchet wheel 23, which may be engaged by a pawl 24, preventing downward motion of the conveyor, except when the pawl is released by the operator by means of handle 25.

The conveyor may be built in the truck, and driven in any suitable manner, or else it may be installed on a truck already in operation, to be driven by means of some suitable mechanism also adapted to be installed on a truck without difficulty. In Fig. 1, for instance, the conveyor is shown driven by the power plant of the truck by means of a friction driving attachment comprising a friction wheel 26 adapted to be pressed against the flywheel or other moving part of the motor, 26, and a flexible shaft 28 running towards the rear of the truck, and transmitting motion from said friction wheel to a suitable operating mechanism.

A suitable arrangement of operating mechanism is shown in Figs. 2, 3, 4, where 10, 13, are the conveyor shafts mentioned; 14 is the conveyor, which is shown of the apron type, 12, 12' are the side arms of the conveyor's frame, and 15, 15' are the shoes or supporting blocks pivotally mounted one at each end of shaft 13.

The slats or other elements of which the conveyor is composed, are mounted upon or carried by side chains 29, 30, which are driven, respectively, by sprocket wheels 31, 32, mounted on shaft 10. Similar sprockets or idlers, not shown, are mounted on shaft 13, completing the conveyor proper.

Shaft 10 is rotatably mounted under the level of the truck's platform, and at the rear of the rear end of said platform, to provide sufficient clearance for the free operation of the conveyor, by means of rearwardly extending brackets or pillow blocks 33, 34. Instead of pivotally mounting arms 12, 12' directly upon the shaft, I prefer to machine the hub portion of said pillow blocks to fit the hub portion 35, 36, of said arms, coaxially to said shaft, so that the weight of the conveyor and of its load will not rest upon the rotating shaft, if means are provided causing the weight of the conveyor's slats or chains and of their load to be partially or totally supported by the side arms. For light loads this is unnecessary, but for heavy loads it is preferable that both the side chains and the shafts be relieved of the duty of carrying the load in its entirety.

This object may be attained in a number of ways, for instance by providing the side arms with one or more intermediate idlers such as shown at 31', acting as intermediate supports for the chains between shafts 10 and 13.

It is sufficient to rotate shaft 10 one way or the other, in order to operate the conveyor in the direction desired. A mechanism suitable for this purpose is shown, consisting of a casing 37 mounted under the truck's platform at one side, receiving one of the ends of shaft 10, and a gearing mounted in said casing.

Said gearing consists of a pinion 38, mounted on a shaft 39, on which is fixed the clutch shell 40. 41 designates a shaft driven by shaft 28 or by any other suitable means, and 42 a clutch member slidably keyed on said shaft and normally engaging clutch shell 40. Said clutch member may be shifted out of engagement, to disconnect shaft 39, by means of a clutch lever 43, mounted on pivotal shaft 44, controlled by hand lever 45.

Pinion 38 is in mesh with a spur gear 46, integral with a conical pinion 47, rotatably mounted upon a shaft 48. Pinion 47 is in mesh with a conical gear 49, at right angle thereto, which is also in mesh with another conical pinion 50, rotatably mounted on shaft 48 at a point diametrally opposite to pinion 47. Pinion 47, 50, are provided with clutch teeth or projections 51, 52, adapted to be engaged by similar clutch teeth or projections of a clutch sleeve 53, slidably keyed on shaft 48 between the two pinions. Said sleeve is shown in its intermediate or neutral position, when it is disengaged from both pinions, and no motion is transmitted to shaft 48. Shaft 48 carries a worm which drives a worm wheel 54 mounted on shaft 10.

Clutch sleeve 53 is operated by a clutch lever 55, mounted on a pivotal shaft 56, controlled by a hand lever 57; if hand lever 57 is moved to the left of its neutral position shown, shaft 48 will become connected to pinion 47, and will be caused to rotate in a direction opposite to that of the rotation of shaft 41; and if hand lever 57 is moved to the right, shaft 48 will become connected to pinion 50, and will rotate in the same direction as shaft 41, inverting the sense of rotation of shaft 10. When sleeve 53 is shifted into mesh with one or the other pinion, it is good practice to first disconnect clutch member 42 by means of hand lever 45.

While no speed change mechanism is shown, it is obvious that a multiple speed gearing can be used, if desired.

I have found this device to be extremely convenient for the rapid loading of small and medium size parcels, which could not be conveniently handled by a hoist on account of the time required for attaching and detaching.

The device may also be built to handle heavy parcels, such as scrap metal bales, cases of hardware, etc., or else the conveyor may be especially designed for the handling of barrels or other articles of various nature.

The arrangement shown is very convenient, lending itself, as it does, to quick operation, being always ready, and not interfering in any way with the useful loading space on the truck. The device may be easily installed, and is admirably well suited for use in combination with the power attachment for trucks forming the object of my other application above-referred to.

The drawings are intended for illustrative purposes only, and not in a limiting sense, since it is obvious that my invention can be carried into practice in ways different from the one shown, without departing from the inventive idea.

I therefore reserve myself the right to modify the embodiments of my invention in any way or manner which may best answer various requirements, and such as may enter, fairly, into the scope of the appended claims.

I claim:

1. In combination, a truck having a stationary platform floor, a conveyor comprising a carrying surface outwardly extending from said platform floor and adapted to carry materials to the same, the inner end of the conveyor carrying surface being substantially on a level with the upper surface of said platform floor, and means for moving said carrying surface.

2. In combination, a truck having a stationary platform floor, a conveyor comprising a carrying surface outwardly extending from said platform floor pivotedly mounted thereon and adapted to carry materials to said stationary floor, and means for moving said carrying surface, said conveyer being movable into an upright position when not in use to constitute a closure for the rear of the truck.

GUIDO M. SACERDOTE.